March 7, 1967 R. H. NORMAN ET AL 3,308,286

STATISTICAL DECISION CIRCUIT

Filed Dec. 3, 1964 3 Sheets-Sheet 1

INVENTORS
ROBERT H. NORMAN
LAURENCE E. BANGHART
BY Jack M. Wiseman
ATTORNEY

March 7, 1967 R. H. NORMAN ET AL 3,308,286

STATISTICAL DECISION CIRCUIT

Filed Dec. 3, 1964 3 Sheets-Sheet 2

INVENTORS
ROBERT H. NORMAN
LAURENCE E. BANGHART

BY Jack M. Wiseman

ATTORNEY

FIG. 3

TRUTH TABLE

| COUNTER | | LOGIC CIRCUITS | | | | NUMBER OF SHIFT REGISTER DEVICES IN COUNTDOWN (SHIFT REGISTERS 61-67) | DUTY CYCLE | PROBABILITY FUNCTIONS |
|---|---|---|---|---|---|---|---|---|
| DECIMAL | BINARY | 70 | 75 | 80 | 85 OR SHIFT REGISTER 68 | | | |
| 15 | 1111 | 0 | 0 | 0 | OUT | 7 | INV | 255/256 |
| 14 | 1110 | 1 | 0 | 0 | OUT | 6 | INV | 127/128 |
| 13 | 1101 | 0 | 1 | 0 | OUT | 5 | INV | 63/64 |
| 12 | 1100 | 1 | 1 | 0 | OUT | 4 | INV | 31/32 |
| 11 | 1011 | 0 | 0 | 1 | OUT | 3 | INV | 15/16 |
| 10 | 1010 | 1 | 0 | 1 | OUT | 2 | INV | 7/8 |
| 9 | 1001 | 0 | 1 | 1 | OUT | 1 | INV | 3/4 |
| 8 | 1000 | 1 | 1 | 1 | OUT | 0 | INV | 1/2 |
| 7 | 0111 | 1 | 1 | 1 | IN | 1 | TRUE | 1/4 |
| 6 | 0110 | 0 | 1 | 1 | IN | 2 | TRUE | 1/8 |
| 5 | 0101 | 1 | 0 | 1 | IN | 3 | TRUE | 1/16 |
| 4 | 0100 | 0 | 0 | 1 | IN | 4 | TRUE | 1/32 |
| 3 | 0011 | 1 | 1 | 0 | IN | 5 | TRUE | 1/64 |
| 2 | 0010 | 0 | 1 | 0 | IN | 6 | TRUE | 1/128 |
| 1 | 0001 | 1 | 0 | 0 | IN | 7 | TRUE | 1/256 |

COUNTER TRUTH TABLE

| NO. OF SHIFT REGISTERS OPERATING | DUTY CYCLE |
|---|---|
| 7 | 1/256 |
| 6 | 1/128 |
| 5 | 1/64 |
| 4 | 1/32 |
| 3 | 1/16 |
| 2 | 1/8 |
| 1 | 1/4 |
| 0 | 1/2 |

FIG. 4

INVENTORS
ROBERT H. NORMAN
LAURENCE E. BANGHART
BY Jack M. Wiseman
ATTORNEY

United States Patent Office 3,308,286

Patented Mar. 7, 1967

3,308,286

STATISTICAL DECISION CIRCUIT

Robert H. Norman, Los Altos, and Laurence E. Banghart, Woodside, Calif., assignors to General Micro-Electronics Inc., Santa Clara, Calif., a corporation of Delaware Filed Dec. 3, 1964, Ser. No. 415,589
13 Claims. (Cl. 235—177)

The present invention relates in general to statistical decision circuits, and more particularly to a probability function generator and comparator.

An object of the present invention is to provide an improved statistical decision circuit.

Another object of the present invention is to provide a digital probability function generator and comparator.

Another object of the present invention is to provide a statistical decision circuit with improved accuracy.

Another object of the present invention is to provide a statistical decision circuit which automatically establishes the required probability of a correct decision.

Another object of the present invention is to provide a statistical decision circuit in which a total digital system is employed without converting from digital to analog or from analog to digital.

Briefly described, the digital probability function generator and comparator of the present invention receives a random pulse signal, which represents data or unknown information to be determined or analyzed. Such a random pulse signal is fed to one input of a comparator circuit. The output of the comparator circuit controls the operation of a decision indicator.

The digital probability function generator and comparator also includes logic circuits. A demultiplexer, not shown, transmits to the logic circuits pulses representing a projected or anticipated solution or answer to the unknown information or statistical data represented by the random pulse. Should the demultiplexer transmit by means of digital pulses the correct answer or solution to the logic circuits, then the pulse fed to the comparator circuit through the logic circuits will coincide as to frequency, pulse duration and logic level with the random pulse signal fed to the comparator circuit. When this occurs, the decision indicator is operated. Should the decision indicator remain in its initial state, then the correct decision has not been projected or anticipated and the demultiplexer continues to transmit digital pulses to the logic circuits representing further and additional projections of the solution or answer.

Toward this end, the digital probability function generator and comparator 10 includes a clock pulse generator which transmits continuously in clock synchronism a series of squarewave pulses to a leading shift register or counter of a series of successive and sequentially operated registers or counters. The series of shift registers or counters form a chain countdown arrangement.

The logic circuits selectively control the operation of the counters to cause the counters, respectively, to be "on" or "off." An "on" counter reduces the frequency of the clock pulse signal advancing therethrough by one-half. An "off" counter does not alter the frequency of the clock pulse signals advancing therethrough. As a consequence thereof, the frequency of the clock pulse signal transmitted by the last counter of the series of counters represents the projected or anticipated solution or answer transmitted by the demultiplexer. This output signal is transmitted through a switching circuit and through the logic circuits to be impressed on another input of the comparator circuit.

Other and further objects and advantages of the present invention will be apparent to one skilled in the art from the following description taken in conjunction with the accompanying drawings, in which:

FIG. 3 is a truth table for the probability function generator and comparator illustrated in FIGS. 1 and 2.

FIG. 4 is a truth table for the binary counters employed in the probability function generator and comparator of the present invention.

Figures 1, 5:
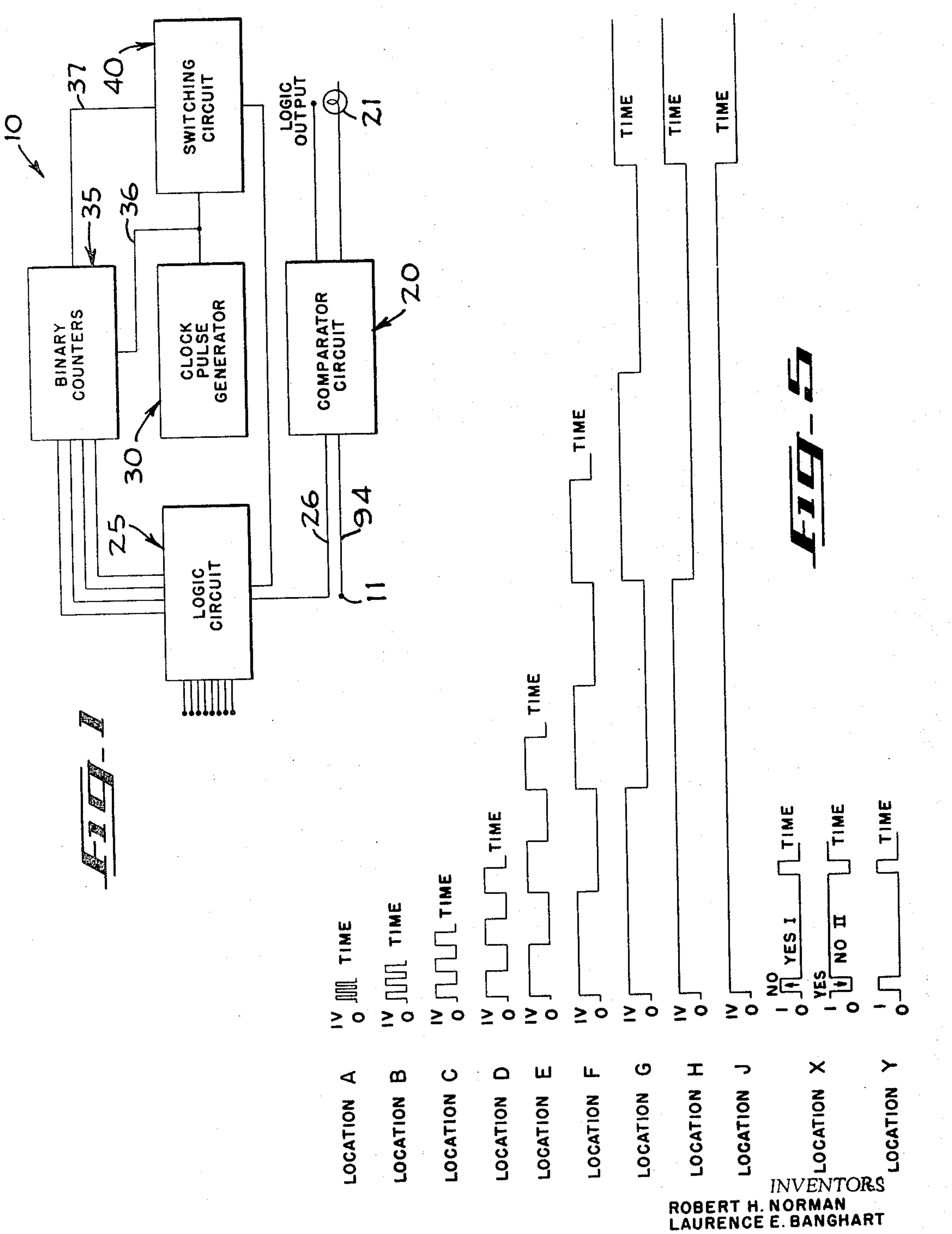
FIG. 1 is a block diagram of the probability function generator and comparator of the present invention.
FIG. 5 is a diagrammatic illustration of signal pulses produced at various locations in the probability function generator and comparator illustrated in FIG. 2.

Illustrated in FIG. 1 is the digital probability function generator and comparator 10, which comprises a terminal 11 for receiving a random pulse signal. The random pulse signal may represent statistical data or unknown information to be determined or analyzed. Such a random pulse signal is fed to a comparator circuit 20, which controls the operation of a decision indicator, such as a lamp 21.

Also included in the digital probability function generator 10 is a logic circuit 25. A demultiplexer, not shown, transmits to the logic circuit 25 digital pulses representing a projected or anticipated solution or answer to the unknown information or statistical data represented by the random pulse signal. Should the demultiplexer transmit by means of digital pulses the correct answer or solution, then the pulse signal fed to the comparator circuit 20 over the conductor 26 will coincide as to frequency, pulse duration and logic level with the random pulse signal impressed on the terminal 11. It is within the contemplation of the present invention that the coincidence may be in the logic level and timing. As a consequence thereof, the lamp 21 will be illuminated to indicate the correct decision. On the other hand, if the lamp 21 remains extinguished, then the correct decision has not been projected or anticipated and the demultiplexer continues to transmit digital pulses representing further and additional projections of the solution or answer.

It is within the contemplation of the present invention to have fed to the comparator 20 over the conductor 26 a pulse signal representing a preselected desired answer or solution, which will be established by the demultiplexer transmitting the digital pulse signal to the logic circuit 25 in a manner previously described. Under these conditions, a varying random pulse signal, such as a signal representing the hysteresis curve of a magnetic core, is impressed on the terminal 11 until the random pulse signal coincides as to frequency, pulse duration and logic level with the digital pulse signal transmitted over the conductor 26 to the comparator circuit 20. When the condition of coincidence occurs, the lamp 21 will be illuminated under the control of the comparator circuit 20 to indicate the correct decision has been reached. Until the correct decision has been reached, the lamp 21 will remain extinguished.

In achieving the foregoing operations, the digital probability function generator and comparator 10 of the present invention includes a clock pulse generator 30, which produces continuously in clock synchronism a series of square wave pulses. The frequency of the clock pulses, in the preferred embodiment, is in the vicinity of 125 kc. The output of the clock pulse generator 30 is connected to a plurality of binary counters or shift register devices 35 over a conductor 36. The binary counters or shift register devices 35 are connected in cascade or in series for successive and sequential operation.

Each clock pulse signal transmitted to the binary counters 35 by the clock pulse generator 30 is counted down by the binary counters 35 under the control of the logic circuit 25 so that the output pulse signal of the binary counters 35, which is transmitted over the conductor 37, is representative of the projected or anticipated solution or answer transmitted by the multiplexer. The output pulse signal transmitted over the conductor 37 advances through a switching circuit 40, through the logic circuit 25, and over the conductor 26 to be impressed on the comparator circuit 20.

The probability function generator and comparator 10 automatically obtains the desired probability function in arriving at the correct decision. Toward this end, the demultiplexer transmits to the logic circuit 25 digital pulse signals. The logic circuit 25, in turn, controls the operation of the binary counters 35 to render selected ones thereof operative or on. By varying the length of the countdown chain of the binary counters 35 or by controlling the number of operative shift register devices in the binary counters 35, the duty cycle or the probability of arriving at a correct decision, when the lamp 21 is illuminated or extinguished, is changed.

Figure 2:
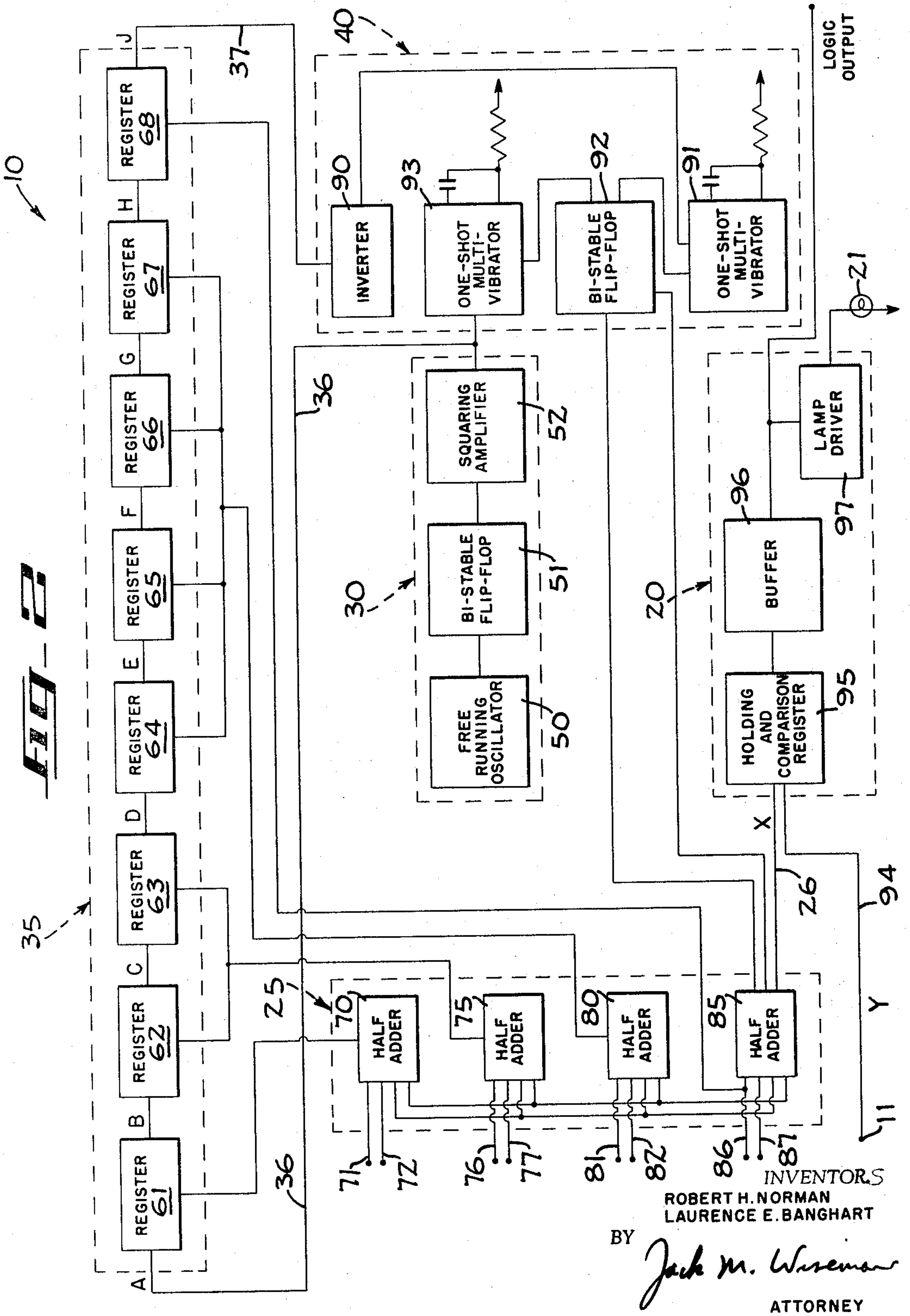
FIG. 2 is a block diagram in greater detail of the probability function generator and comparator shown in FIG. 1.

In FIG. 2, it is shown that the clock pulse generator 30 comprises a conventional free running oscillator or an astable multivibrator 50. Connected to the output of the free running oscillator 50 is a conventional bistable flip-flop circuit 51, which produces in the output thereof square wave pulses having twice the frequency or one-half the pulse duration of the output pulses produced by the free running oscillator 50. The output pulses of the flip-flop circuit 51 is additionally squared and divided by a well-known squaring amplifier 52, whereby the output pulses thereof have twice the frequency or one-half the pulse duration of the output pulses produced by the flip-flop circuit 51. Thus, the clock pulse generator 30 transmits over the conductor 36 to the binary counters 35 at station A (FIGS. 2 and 5) clock pulses at a frequency preferably in the vicinity of 125 kc.

In the exemplary embodiment of the present invention, the binary counters 35 include a plurality of conventional shift register devices or binary counters 61–68 connected in cascade or in series to form a chain countdown arrangement. The shift register device 61 receives the clock pulse signal from the clock pulse generator 30. If the shift register device 61 is off or rendered inoperative, the incoming pulse signal is advanced to the succeeding shift register 62 as if the shift register device 61 were by-passed. On the other hand, should the shift register device 61 be on or operative, then the output pulse signal therefrom (FIG. 5) at station B is one-half the frequency or twice the pulse duration with respect to its input pulse signal at station A. The on or off condition or the operativeness of the shift register 61 is controlled by a conventional and well-known half adder logic circuit 70 of the logic circuit 25.

The half adder logic circuit 70 is either on or off depending on the digital pulse signals impressed on the input circuits thereof over conductor 71 or 72 from the demultiplexer. If the digital pulse signal impressed on the conductor 71 is a high voltage or represents a 1, while the digital control signal impressed on the conductor 72 is a low voltage or represents a 0, then the logic circuit 70 is off and the shift register device 61 is off. Thus, the logic circuit 70 removes or renders inoperative the shift register device 61 when the signal on the conductor 71 is high voltage or represents a 1. Conversely, if the digital control signal impressed on the conductor 72 is a high voltage or represents a 1, while the digital control signal impressed on the conductor 71 is a low voltage or represents a 0, then the logic circuit 70 is on and the shift register device 61 is on.

The shift register device 62 receives the clock pulse signal from the shift register 61. If the shift register device 62 is off or rendered inoperative, then the incoming pulse signal is advanced to the succeeding shift register device 63 as if the shift register device 62 were by-passed. Should the shift register device 62 be on, then the output signal therefrom at station C (FIGS. 2 and 5) will be one-half of the frequency or twice the pulse duration with respect to the input signal from station B. Similarly, in the event the shift register device 63 is off or rendered inoperative, then the incoming pulse signal is advanced to the succeeding shift register device 64 as if the shift register device 63 were by-passed. In the event the shift register device 63 is on, the output signal therefrom at station D (FIGS. 2 and 5) will be one-half of the frequency or twice the pulse duration with respect to the input signal from station C. The on or off conditions or the operativeness of the shift register devices 62 and 63 are controlled by a conventional and well-known half adder logic circuit 75 of the logic circuit 25. The half adder logic circuit 75 is connected to the half adder logic circuit 70 so as to operate sequentially relative thereto.

The half adder logic circuit 75 is either on or off depending upon the digital pulse signals impressed on the input circuits thereof over conductors 76 and 77 by the demultiplexer. If the digital pulse signal impressed on the conductor 76 is a high voltage or represents a 1, while the digital control signal impressed on the conductor 77 is a low voltage or represents a 0, then the logic circuit 75 is off and the shift register devices 62 and 63 are off. Thus, the logic circuit 75 removes or renders inoperative the shift register devices 62 and 63 when the signal on the conductor 76 is a high voltage or represents a 1. Conversely, if the digital control signal impressed on the conductor 77 is a high voltage or represents a 1, while the digital control signal impressed on the conductor 76 is a low voltage or represents a 0, then the logic circuit 75 is on and the shift register devices 62 and 63 are on.

The shift register devices 64–68 operate successively and in the manner previously described for the shift register devices 61–63. If a shift register device is off, its incoming signal is advanced as if the shift register device were by-passed. Should a shift register device be on then the pulse duration of the output signal is twice the pulse duration of the incoming signal and the frequency of the output signal is one-half of the frequency of the incoming signal (see FIGS. 2 and 5).

However, whether the shift register devices 64–67 will be on or off will depend upon the operation of a conventional half adder logic circuit 80 of the logic circuit 25 and the digital pulse signals impressed on the input circuits thereof over conductors 81 and 82 by the multiplexer. The half adder logic circuit 80 removes or renders inoperative the shift register devices 64–67 when the signal on the conductor 81 is a high voltage or represents a 1 and the signal on the conductor 82 is a low voltage or represents a 0. Conversely, if the digital control signal impressed on the conductor 82 is a high voltage or represents 1, while the digital control signal impressed on the conductor 81 is a low voltage or a 0, then the logic circuit 80 is on and the shift register devices 64–67 are on.

A conventional half adder logic circuit 85 of the logic circuit 25 controls the operation of the shift register device 68 to render the same either on or off. The logic circuit 85 operates in the manner previously described for the logic circuits 70, 75 and 80, and is connected to the half adder logic circuit 80 to operate sequentially relative thereto. Whether the shift register device 68 will be on or off will depend upon the operation of the digital pulse signals impressed on the input circuits thereof over conductors 86 and 87 by the multiplexer. Thus, the half adder logic circuit 85 removes or renders inoperative the shift register device 68, when the signal on the conductor 86 is a high voltage or represents a 1 and the signal on the conductor 87 is a low voltage or represents a 0. On the other hand, if the digital control signal impressed on the conductor 87 is a high voltage or represents a 1 and the digital control signal on the conductor 86 is a low voltage or represents a 0, then the logic circuit 85 is on and the shift register device 68 is on.

Connected to the output of the binary counters 35 and, specifically, the output of the shift register device 68 is the switching circuit 40. As shown in FIG. 2, the switching circuit 40 comprises a conventional inverter circuit 90, which has the input thereof connected to the output of the shift register device 68. The output of the inverter 90 is connected to the input of a conventional one shot multivibrator circuit 91, which, in turn, has the output thereof connected to the set input circuit of a conventional bi-stable flip-flop circuit 92.

The output of the clock pulse generator 30 and, specifically, the output of the squaring amplifier 52 thereof is connected to the input of a conventional one shot multivibrator 93, which is part of the switching circuit 40. Now, the output of the one shot multivibrator 93 is connected to the reset input circuit of the bi-stable flip-flop circuit 92. Hence, the one shot multivibrator 91 has its output connected to the set input circuit of the bi-stable flip-flop circuit 92 and the one shot multivibrator circuit 93 has its output circuit connected to the reset input circuit of the bi-stable flip-flop circuit 92. The output of the bi-stable flip-flop circuit 92 is connected to the logic circuit 25 and, specifically, the half adder logic circuit 85.

When all of the shift register devices 61–68 are operating, the bi-stable flip-flop circuit 92 is set every 256$^{th}$ clock pulse over the path including the inverter 90 and the one shot multivibrator 91 and is reset ½ clock pulse later by the output of the clock pulse generator 30 and particularly the output of the squaring amplifier 52 over a path including the one shot multivibrator 93. Under these circumstances, the duty cycle is $\frac{1}{512}$. Since the length of the countdown chain or the operable shift registers 61–68 are automatically varied, the duty cycle is automatically changed and the probability of arriving at a correct decision or the probability function, when the lamp 21 is illuminated or extinguished, is also varied.

When seven shift register devices are operating, the bi-stable flip-flop circuit 92 is set every 128 clock pulses over the path includin the inverter 90 and the one shot multivibrator 91 and is reset ½ clock pulse later by the output of the clock pulse generator 30 over a path including the one shot multivibrator 93. Hence, the duty cycle is $\frac{1}{256}$ (FIG. 4). When the decimal counter is 15, the probability function is $\frac{255}{256}$ and when the decimal counter is 1 the probability function is $\frac{1}{256}$. From FIGS. 3 and 5, the duty cycle and probability function can be correlated with respect to the number of shift register devices operating. The operation thereof will be in a manner similar to that previously described for seven shift register devices operating.

The half adder logic circuit 70 removes the shift register device 61 when the demultiplexer output is a high voltage or represents 1 and the decimal number is below 8. Further, the half adder logic circuit 70 removes the shift register device 61 when the demultiplexer output is a high voltage or represents a 1 and the decimal number or counter is 8 or above. The half adder logic circuit 75 removes the shift register devices 62 and 63, and the half adder logic circuit 80 removes the shift register devices 64–67 by similar logic. When the counter is at 8 or above, the half adder logic circuit 85 is off and the shift register device 68 is removed. When the counter is below 8, the half adder logic circuit 85 is on and the shift register device 68 is on.

The duty cycles (FIGS. 3 and 4) are true or correct for counts of seven and below. Using the inverted signals of the bi-stable flip-flop circuit 92 provides the correct duty cycles for counts of eight and above. This is accomplished through the half adder logic circuit 85.

Now, the pulse signal output from the bi-stable flip-flop 92 will have a fixed pulse width, but the length between pulses will vary dependent upon the projected or anticipated answer or solution as represented by the multiplexer transmitting digital pulse signals to the logic circuit 25. The output of the bi-stable flip-flop circuit 92 is fed to the half adder logic circuit 85, whereby the output thereof will have a fixed pulse width, but the length between pulses will be determined by the length between pulses in the output of the bi-stable flip-flop circuit 92. In addition, the polarity of the pulse in the output of the half adder logic circuit 85 will be determined by whether the counter is below 8 or 8 or above. If the counter is below 8, the polarity of the pulse signals are true. In the event the counter is 8 or above, the pulse signals are inverted. (See FIGS. 2 and 5 for location X.) Pulse signal I at location X shows the polarity for decimal numbers 8–15 and pulse signal II at location X shows the polarity for decimal number 1–7.

At this time, the output of the half adder logic circuit 85 is fed to the comparator circuit 20 over the conductor 26 and the random pulse signal impressed on the terminal 11 is fed to the comparator circuit 20 over a conductor 94. As shown in FIG. 2, the comparator circuit 20 comprises a conventional holding and comparator register circuit 95, which has the input circuits thereof connected to the conductors 26 and 94. The output circuit thereof is connected to a conventional buffer circuit 96, which, in turn, has its output connected to a conventional lamp driver 97. The lamp 21 is connected to the output of the lamp driver 97.

Should the output pulse signal from the half adder logic circuit 85 over the conductor 26 be coincident as to frequency, pulse duration and logic level with the random pulse signal impressed on the terminal 11 for transmission over the conductor 94 as detected by the holding and comparator register circuit 95 (see FIGS. 2 and 5 for locations X and Y), then the lamp 21 will be illuminated over a path including the buffer 96 and lamp driver 97 to indicate a correct decision. In the event the pulse signal fed to the holding and comparator register circuit 95 over the conductors 26 and 94 are not coincident as to frequency and logic level, then the lamp 21 will remain extinguished to indicate an incorrect decision. The holding and comparator register circuit 95 holds the answer pulse signal until the next decision pulse signal as transmitted by the multiplexer signal.

From FIG. 5, it is to be observed the pulse signal I at station X will give a yes decision with the random pulse signal at station Y, while the pulse signal II at station X will give a no decision with the random pulse signal at station Y. Thus, the coincidence for a yes answer occurs when the trailing edge of the answer pulse signal is going polarity wise opposite to the random pulse signal at the time the random pulse is present. Hence, for a yes decision there is an opposite polarity at the same time to a minimum time duration between the answer pulse signal and the random pulse signal to obtain a yes decision.

It should be observed that the variable-width duty cycle signal is sampled for a yes/no answer by the holding and comparator register circuit 95 by the random decision pulse signal over the conductor 94 with a time uncertainty of approximately .04 microsecond. With a clock pulse signal of 125 kc. the minimum wavelength out of the countdown chain is 8 microseconds. This results in an uncertainty of ½ of 1 percent, and that uncertainty is random. This leaves the maximum wavelength at 2000 microseconds with a maximum decision rate of several hundred per second.

In operation, the statistical decision circuit 10 of the present invention establishes the probability of a correct decision answer and compares the projected or anticipated answer or solution with the random decision pulse signal and visually indicates whether the projected answer or solution is the correct decision by means of operating a visual device.

A random pulse signal is impressed on the terminal 11 and fed to the holding and comparator register circuit 95 over the conductor 94. A multiplexer, not shown, transmits digital pulse signals to the half adder logic circuits 70, 75, 80 and 85 to represent a projected or anticipated answer. Assuming the counter decimal 4 is the selected answer and, therefore, the counter binary is 0100. Accordingly, the half adder logic circuits 70 and 75 are off or removed (FIG. 3) and the half adder logic circuits 80 and 85 are in or on.

Hence, the shift register devices 61–63 are off or removed and the shift register devices 64–68 are in or on. The bi-stable flip-flop circuit is set every 16 clock pulses and would be reset ½ clock pulse after. The duty cycle is $1/32$ and the probability of a correct decision $1/32$. Should the random pulse signal impressed on the terminal 11 and fed to the holding and comparator register circuit 95 be coincident in frequency, pulse duration and logic level with the counter 4 pulse signal impressed on the conductor 26 from the output of the half added logic circuit 85, in response to the output of the bi-stable flip-flop circuit 92, and fed to the holding and comparator register 95, then the lamp 21 will be illuminated to indicate the correct decision. If not, the lamp 21 remains extinguished.

By following the truth table of FIG. 3, the operation of the probability function generator and comparator 10 of the present invention can be determined for counters other than the decimal 4.

It is to be understood that modifications and variations of the embodiments of the invention disclosed herein may be resorted to without departing from the spirit of the invention and the scope of the appended claims.

Having thus described our invention, what we claim as new and desire to protect by Letters Patent is:

1. A statistical decision circuit comprising a plurality of binary counters connected for successive operation, a clock pulse generator connected to a leading binary counter of said binary counters for transmitting thereto a clock pulse signal, a logic circuit connected to each of said binary counters for selectively controlling the operation thereof respectively to produce in the output of a trailing binary counter of said binary counters a pulse signal representing a preselected answer to a decision and to establish the probability of a correct decision, each of said logic circuits being operative to control the operation of its associated binary counter for selecting the frequency of the pulse signal advancing through the associated binary counter, a comparator circuit, means interconnecting said trailing binary counter with said comparator circuit to feed to said comparator circuit a selected answer pulse signal, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

2. A statistical decision circuit comprising a plurality of binary counters connected to successive operation, a clock pulse generator connected to a leading binary counter of said binary counters for transmitting thereto a clock pulse signal, a logic circuit connected to each of said binary counters for selectively controlling the operation thereof respectively to produce in the output of a trailing binary counter of said binary counters a pulse signal representing a preselected answer to a decision and to establish the probability of a correct decision, each of said logic circuits being operative to control the operation of its associated binary counter for selecting the length between pulses of the pulse signal advancing through the associated binary counter, a comparator circuit, means interconnecting said comparator circuit with said trailing binary counter of said binary counters to feed to said comparator circuit an answer pulse signal in which the length between pulses represents the selected answer, means for feeding to said comparator circuit a random pulse signal in which the length between pulses represents information to be analyzed, said comparator circuit being operative to compare the length between pulses between said answer pulse signal and said random pulse signal, and indicating means responsive to said comparator circuit for indicating a correct or an incorrect answer.

3. A statistical decision circuit comprising a plurality of shift register devices connected for successive operation, a clock pulse generator, connected to a leading shift register device of said shift register devices for transmitting thereto a clock pulse signal, a logic circuit responsive to binary digital pulse signals and connected to each of said shift register devices for selectively controlling the operation thereof respectively to produce in the output of a trailing shift register device of said shift register devices a pulse signal having a frequency representing a preselected answer to a decision and to establish the probability of a correct decision, each of said shift register devices when rendered inoperative advances the pulse signal applied to the input thereof without changing the pulse duration thereof and when rendered operative produces in the output thereof a pulse signal of a multiple of the pulse duration of the pulse signal applied to the input thereof, a comparator circuit, means interconnecting said comparator circuit with said trailing shift register to feed to said comparator circuit an answer pulse signal in which the length between pulses represents the selected answer, means for feeding to said comparator circuit a random pulse signal in which the length between pulses represents information to be analyzed, said comparator circuit being operative to compare the length between pulses between said answer pulse signal and said random pulse signal to detect a coincidence therebetween, and indicating means responsive to said comparator circuit for indicating a correct or an incorrect answer.

4. A statistical decision circuit comprising a plurality of binary counters connected for successive operation, a pulse generator connected to a leading binary counter of said binary counters for transmitting thereto a pulse signal, a logic circuit connected to each of said binary counters for selectively controlling the operation thereof respectively to produce in the output of a trailing binary counter of said binary counters a pulse signal representing a preselected answer to a decision and to establish the probability of a correct decision, each of said logic circuits being operative to control the operation of its associated binary counter for selecting the frequency of the pulse signal advancing through the associated binary counter, a comparator circuit, means interconnecting said trailing binary counter with said comparator circuit to feed to said comparator circuit a selected answer pulse signal, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

5. A statistical decision circuit comprising a plurality of binary counters connected for successive operation, a pulse generator connected to a leading binary counter of said binary counters for transmitting thereto a pulse signal, a logic circuit connected to each of said binary counters for selectively controlling the operation thereof respectively to produce in the output of a trailing binary counter of said binary counters a pulse signal representing a preselected answer to a decision, each of said logic circuits being operative to control the operation of its associated binary counter for selecting the frequency of the pulse signals advancing through the associated binary counter, a comparator circuit, means interconnecting said trailing binary counter with said comparator circuit to feed to said comparator circuit a selected answer pulse signal, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

6. A statistical decision circuit comprising a plurality of binary counters connected for successive operation, a clock pulse generator connected to a leading binary counter for transmitting thereto a clock pulse signal, a logic circuit connected to each of said binary counters for selectively controlling the operation thereof respectively to produce in the output of a trailing binary counter of said binary counters a pulse signal representing a preselected answer to a decision, each of said logic circuits being operative to control the operation of its associated binary counter for selecting the frequency of the pulse signals advancing through the associated binary counter, a comparator circuit, means interconnecting said trailing binary counter with said comparator circuit to feed said comparator circuit a selected answer pulse, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

7. A statistical decision circuit comprising a plurality of binary counters connected for successive operation, a clock pulse generator transmitting to a leading binary counter of said binary counters a clock pulse signal, a logic circuit connected to said binary counters for selectively controlling the operation thereof to produce a pulse signal in the output of a trailing binary counter of said binary counters, an answer binary counter connected to the output of said trailing binary counter for receiving therefrom said pulse signal, an answer logic circuit connected to said answer binary counter for controlling the operation thereof in accordance to whether a preselected answer to a decision is above or below a predetermined integer, said answer binary counter producing in the output thereof an answer pulse signal representing a preselected answer to a decision and to establish the probability of a correct decision, a switching circuit interconnecting said answer binary counter with said answer logic circuit and operative in response to the answer pulse signal produced in the output of said answer binary counter for feeding to said answer logic circuit said answer pulse signal, a comparator circuit connected to said answer logic circuit for receiving therefrom said answer pulse signal, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

8. A statistical decision circuit comprising a plurality of binary counters connected for successive operation, a clock pulse generator transmitting to a leading binary counter of said binary counters a clock pulse signal, a logic circuit connected to said binary counters for selectively controlling the operation thereof to produce in the output of a trailing binary counter of said binary counters a pulse signal, an answer binary counter connected to the output of said trailing counter for receiving therefrom said pulse signal, an answer logic circuit connected to said answer binary counter for controlling the operation thereof in accordance to whether a preselected answer to a decision is above or below a predetermined integer, said answer binary counter producing in the output thereof an answer pulse signal with a pulse duration and frequency representing a preselected answer to a decision and to establish the probability of a correct decision, a switching circuit interconnecting said answer binary counter with said answer logic circuit and operative in response to the answer pulse signal produced in the output of said answer binary counter for feeding to said answer logic circuit an answer pulse signal in which the length between pulses represents the selected answer, a comparator circuit connected to said answer logic circuit for receiving therefrom the answer pulse signal of a selected polarity in which the length between pulses represents the selected answer, means for feeding to said comparator circuit a random pulse signal in which the length between pulses represents information to be analyzed, said comparator circuit being operative to compare said answer pulse signal with said random pulse signal, and means responsive to said comparator circuit for indicating a correct or an incorrect answer.

9. A statistical decision circuit comprising a plurality of shift register devices connected for successive operation, a clock pulse generator transmitting to a leading shift device of said shift register devices a clock pulse signal, a logic circuit responsive to binary digital pulse signals and connected to said shift register devices for selectively controlling the operation thereof to produce in the output of a trailing shift register device of said shift register devices a pulse signal, each of said shift register devices when rendered inoperative advances the pulse signal applied to the input thereof without changing the pulse duration thereof and when rendered operative produces in the output thereof a pulse signal of a multiple of the pulse duration of the pulse signal applied to the input thereof, an answer shift register device connected to the output of said trailing shift register device for receiving therefrom said pulse signal, said answer shift register device when rendered inoperative advances the pulse signal applied to the input thereof without changing the pulse duration thereof and when operative produces in the output thereof a pulse signal of a multiple of the pulse duration of the pulse signal applied to the input thereof, an answer logic circuit connected to said answer shift register device for controlling the operation thereof in accordance to whether a preselected answer to a decision is above or below a predetermined integer, said answer shift register device producing in the output thereof a pulse signal having a pulse duration representing a preselected answer to a decision and to establish the probability of a correct decision, a switching circuit interconnecting said answer shift register device with said answer logic circuit and operative in response to the answer pulse signal produced in the output of said answer shift register device for feeding to said answer logic circuit an answer pulse signal in which the length between pulses represents the selected answer, a comparator circuit connected to said answer logic circuit for receiving therefrom the answer pulse signal of selected polarity in which the length between pulses represents the selected answer, means for feeding to said comparator circuit a random pulse signal in which the length between pulses represents information to be analyzed, said comparator circuit being operative to compare the length between pulses between said answer pulse signal and said random pulse signal to detect a coincidence therebetween, and indicating means responsive to said comparator circuit for indicating a correct or an incorrect answer.

10. A statistical decision circuit comprising a plurality of binary counters connected for successive operation, a pulse generator transmitting to a leading binary counter of said binary counters a pulse signal, a logic circuit connected to said binary counters for selectively controlling the operation thereof to produce in the output of a trailing binary counter of said binary counters a pulse signal representing a preselected answer to a decision, an answer binary counter connected to the output of said trailing binary counter for receiving thereform said pulse signal, an answer logic circuit connected to said answer binary counter for controlling the operation thereof in accordance to whether a preselected answer to a decision is above or below a predetermined integer, said answer counter producing in the output thereof an answer pulse representing a preselected answer to a decision, a switching device interconnecting said answer binary counter with said answer logic circuit and operative in response to the answer pulse signal produced in the output of said answer binary counter for feeding to said answer logic circuit said answer pulse signal, a comparator circuit connected to said answer logic circuit for receiving thereform said answer pulse signal, means for feeding to said comparator circuit a random pulse signal representing information to be analyzed, said comparator circuit being operative to compare said answer pulse signal with said random pulse signal, and indicating means responsive to said comparator circuit for indicating a correct or an incorrect answer.

11. A statistical decision circuit comprising a plurality of binary counters connected for successive operation, a clock pulse generator transmitting to a leading binary counter of said binary counters a clock pulse signal, a logical circuit connected to said binary counters for selectively controlling the operation thereof to produce in the output of a trailing binary counter of said binary counters a pulse signal representing a preselected answer to a decision and to establish the probability of a correct decision, a comparator circuit, means interconnecting said trailing binary counter with said comparator circuit to feed to said comparator circuit a selected answer pulse signal, means for feeding to said comparator circuit a random pulse signal representing information to be analyzed, said comparator circuit being operative to compare during the same period of time said answer pulse signal with said random pulse signal for logic level, and indicating means responsive to said comparator circuit for indicating a correct or an incorrect answer.

12. A statistical decision circuit comprising a plurality of binary counters connected for successive operation, a clock pulse generator transmitting to a leading binary counter of said binary counters a clock pulse signal, a logic circuit connected to said binary counters for selectively controlling the operation to produce a pulse signal in the output of a trailing binary counter of said binary counters, an answer binary counter connected to the output of said trailing binary counter for receiving therefrom said pulse signal, an answer logic circuit connected to said answer binary counter for controlling the operation thereof in accordance to whether a selected answer to a decision is above or below a predetermined integer, said answer binary counter producing in the output thereof an answer pulse signal representing a preselected answer to a decision and to establish the probability of a correct decision, a switching circuit interconnecting said answer binary counter with said answer logic circuit and operative in response to the answer pulse signal produced in the output of said answer binary counter for feeding to said answer logic circuit said answer pulse signal, a comparator circuit connected to said answer logic circuit for receiving thereform said answer pulse signal, means for feeding to said comparator circuit a random pulse signal representing information to be analyzed, said comparator circuit being operative to compare during the same period of time said answer pulse signal with said random pulse signal for logic level, and indicating means responsive to said comparator circuit for indicating a correct or an incorrect answer.

13. A statistical decision circuit comprising a plurality of shift register devices connected for successive operation, a clock pulse generator transmitting to a leading shift device of said register shift devices a clock pulse signal, a logic circuit responsive to binary digital pulse signals and connected to said shift register devices for selectively controlling the operation thereof to produce in the output of a trailing shift register device of said shift register device a pulse signal, each of said shift register devices when rendered inoperative advance the pulse signal applied to the input thereof without changing the pulse duration thereof and when rendered operative produces in the output thereof a pulse signal of a multiple of the pulse duration of the pulse signal applied to the input thereof, an answer shift register device connected to the output of said trailing shift register device for receiving therefrom said pulse signal, said answer shift register device when rendered inoperative advance the pulse signal applied to the input thereof without changing the pulse duration thereof and when operative produce in the output thereof a pulse signal of a multiple of the pulse duration of the pulse signal applied to the input thereof, an answer logic circuit connected to said answer shift register device for controlling the operation thereof in accordance to whether a preselected answer to a decision is above or below a predetermined integer, said answer shift register device producing in the output thereof a pulse signal having a pulse duration representing a preselected answer to a decision and to establish the probability of a correct decision, a switching circuit interconnecting said shift register device with said answer logic circuit and operative in response to the answer pulse signal produced in the output of said shift register device for feeding to said answer logic circuit an answer signal in which the length between the pulses represents the selected answer, a comparator circuit connected to said answer logic circuit for receiving and from the answering pulse signal of selected polarity in which the length between pulses represents the preselected answer, means for feeding to said comparator circuit a random signal in which the length between pulses represents information to be analyzed, said comparator circuit being operative to compare the frequency, the pulse duration and logic level between pulses between said answer pulse signal and said random pulse signal to detect a coincidence and therebetween and indicating means responsive to said comparator circuit for indicating a correct or incorrect answer.

References Cited by the Examiner

UNITED STATES PATENTS 3,166,735 1/1965 Clark ____________ 340—146.2

MALCOLM A. MORRISON, *Primary Examiner.*

I. FAIBISCH, M. J. SPIVAK, *Assistant Examiners.*